United States Patent
Wang et al.

(10) Patent No.: US 10,534,215 B2
(45) Date of Patent: Jan. 14, 2020

(54) ARRAY SUBSTRATE AND MANUFACTURING METHOD THEREOF, POLARIZER ATTACHING FILM AND MANUFACTURING METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Mengjie Wang, Beijing (CN); Hongqi Zhang, Beijing (CN); Yufei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 36 days.

(21) Appl. No.: 15/523,285

(22) PCT Filed: Jul. 1, 2016

(86) PCT No.: PCT/CN2016/088083
§ 371 (c)(1),
(2) Date: Apr. 28, 2017

(87) PCT Pub. No.: WO2017/152554
PCT Pub. Date: Sep. 14, 2017

(65) Prior Publication Data
US 2018/0059476 A1    Mar. 1, 2018

(30) Foreign Application Priority Data
Mar. 10, 2016    (CN) .......................... 2016 1 0136372

(51) Int. Cl.
*G02F 1/1335* (2006.01)
*B32B 37/12* (2006.01)
(Continued)

(52) U.S. Cl.
CPC .... *G02F 1/133528* (2013.01); *B32B 37/1284* (2013.01); *B32B 38/10* (2013.01); *G02B 5/3025* (2013.01); *G02F 1/13454* (2013.01)

(58) Field of Classification Search
None
See application file for complete search history.

(56) References Cited

U.S. PATENT DOCUMENTS

| 2013/0312902 A1 | 11/2013 | He et al. |
| 2014/0085563 A1* | 3/2014 | Mathew ............ G02F 1/133308 349/58 |
| 2016/0062524 A1 | 3/2016 | Tang et al. |

FOREIGN PATENT DOCUMENTS

| CN | 101930130 A | 12/2010 |
| CN | 102122098 A | 7/2011 |

(Continued)

OTHER PUBLICATIONS

International Search Report dated Dec. 1, 2016 in corresponding International Application No. PCT/CN2016/088083 along with an English translation of the International Search Report and an English translation of the Written Opinion of the International Searching Authority.

(Continued)

*Primary Examiner* — Darryl J Collins
*Assistant Examiner* — Journey F Sumlar
(74) *Attorney, Agent, or Firm* — Nath, Goldberg & Meyer; Joshua B. Goldberg; Daniel Bissing

(57) ABSTRACT

The present invention discloses an array substrate and a manufacturing method thereof, a polarizer attaching film and a manufacturing method thereof. The manufacturing method of an array substrate includes: removing a part of a release film corresponding to a first attaching area of a polarizer, and attaching the first attaching area of the polarizer onto a base substrate such that the first attaching area is (Continued)

in a non-bonding area; and removing a part of the release film corresponding to a second attaching area of the polarizer, and attaching the second attaching area of the polarizer onto the base substrate such that the second attaching area at least partially overlaps with a bonding area.

16 Claims, 5 Drawing Sheets

(51) Int. Cl.
*B32B 38/10* (2006.01)
*G02B 5/30* (2006.01)
*G02F 1/1345* (2006.01)

(56) References Cited

FOREIGN PATENT DOCUMENTS

| | | |
|---|---|---|
| CN | 102722049 A | 10/2012 |
| CN | 104199574 A | 12/2014 |
| CN | 105572945 A | 5/2016 |
| JP | 2007-233161 A | 9/2007 |

OTHER PUBLICATIONS

Office Action dated Mar. 15, 2018 issued in corresponding Chinese Application No. 201610136372.6.
The Second Office Action dated Oct. 31, 2018 corresponding to Chinese application No. 201610136372.6.

\* cited by examiner

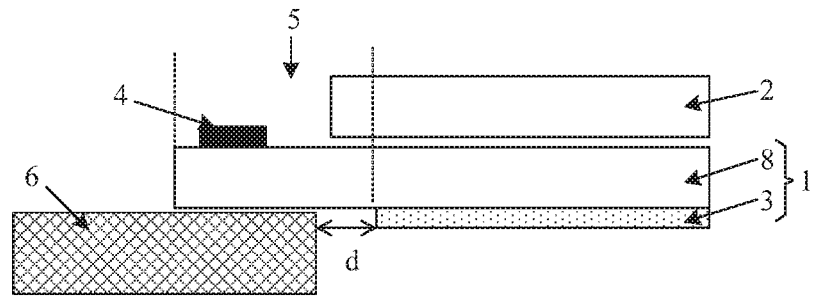

FIG. 1

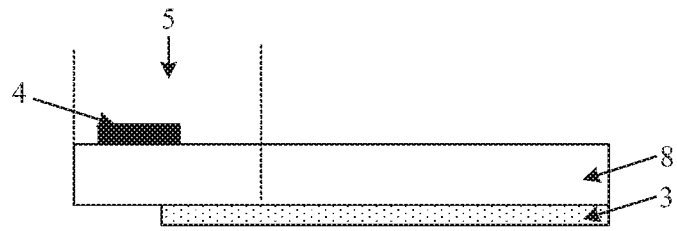

FIG. 2

| removing a part of a release film corresponding to a first attaching area of a polarizer, and attaching the first attaching area of the polarizer onto a base substrate such that the first attaching area is in a non-bonding area. | 101 |

| removing a part of the release film corresponding to a second attaching area of the polarizer, and attaching the second attaching area of the polarizer onto the base substrate such that the second attaching area at least partially overlaps with a bonding area. | 103 |

FIG. 3

ARRAY SUBSTRATE AND MANUFACTURING METHOD THEREOF, POLARIZER ATTACHING FILM AND MANUFACTURING METHOD THEREOF

This is a National Phase Application filed under 35 U.S.C. 371 as a national stage of PCT/CN2016/088083, filed Jul. 1, 2016, an application claiming the benefit of Chinese Application No. 201610136372.6, filed Mar. 10, 2016, the content of each of which is hereby incorporated by reference in its entirety.

TECHNICAL FIELD

The present invention relates to the field of display technology, and particularly relates to an array substrate and a manufacturing method thereof as well as a polarizer attaching film and a manufacturing method thereof.

BACKGROUND

With the development of display technology, liquid crystal display devices, due to their excellent performance such as high quality, low consumption rate, free of radiation, etc., have gradually become the mainstream of the market. A liquid crystal display device typically includes an open cell (OC for short) and a backlight module.

A process for manufacturing an OC generally includes: a pre-process mainly for manufacturing an array substrate and a color filter substrate, a mid-process mainly for assembling the array substrate with the color filter substrate to form a liquid crystal cell and attaching a polarizer to each of upper and lower surfaces of the assembled liquid crystal cell, and a post-process (also referred to as bonding process) for laminating a driving IC and a printed circuit board onto the array substrate.

FIG. 1 is a schematic diagram of performing a bonding process in the prior art. As shown in FIG. 1, an indenter 6 of a bonding device is provided below an array substrate 1 to support the array substrate 1, and then a driving chip 4 is boned onto a base substrate 8 of the array substrate. During the bonding process, it needs to ensure that a distance d between the indenter 6 provided below the array substrate 1 and a polarizer 3 exceeds 0.7 mm, so as to prevent the indenter 6 from contacting the polarizer 3 to cause damage to the polarizer 3.

In the prior art, in order to prevent the polarizer on the array substrate side from being damaged during the bonding process, the base substrate 8 on the array substrate 1 side is partitioned into a bonding area 5 and a non-bonding area in advance (typically, the bonding area and the non-bonding area are divided according to size and position of the driving chip 4, and generally, the bonding area is an area of the array substrate 1 exceeding a color filter substrate 2 and does not overlap with the color filter substrate 2), and during the mid-process, size and covering area of the polarizer 3 on the array substrate 1 side are strictly controlled, so that the polarizer 3 on the base substrate 8 does not overlap with the bonding area 5. In this way, damage to the polarizer caused by the indenter 6 during the bonding process can be effectively avoided.

However, as bezel of the OC gets narrower and narrower (the bezel of an ultra-narrow bezel product is about 1 mm), the bonding area 5 may overlap with the color filter substrate 2, and accordingly, the size of the polarizer 3 on the array substrate side needs to be smaller than that of the color filter substrate, which readily leads to light leakage for hyper-viewing angle.

Therefore, how to effectively avoid the problem of light leakage of a narrow-bezel OC while ensuring normal operation of the bonding process becomes a technical problem to be solved urgently in the art.

SUMMARY

The present invention provides an array substrate, a polarizer attaching film and manufacturing methods thereof, which can not only ensure normal operation of the bonding process but also effectively avoid light leakage of a narrow-bezel OC.

In one aspect, the present invention provides an array substrate including a base substrate and a polarizer, wherein the base substrate is partitioned into a bonding area and a non-bonding area, and the polarizer includes a first attaching area and a second attaching area, the first attaching area being in the non-bonding area and the second attaching area at least partially overlapping with the bonding area.

Optionally, the array substrate further includes a driving chip, which is in the bonding area.

Optionally, an area of the first attaching area is larger than an area of the second attaching area.

Optionally, the second attaching area and the bonding area completely overlap.

In another aspect, the present invention further provides a manufacturing method of an array substrate, the array substrate including a base substrate and a polarizer, the base substrate being partitioned into a bonding area and a non-bonding area, and the manufacturing method of an array substrate including steps of:

removing a part of a release film corresponding to a first attaching area of the polarizer, and attaching the first attaching area of the polarizer onto the base substrate such that the first attaching area is in the non-bonding area, and removing a part of the release film corresponding to a second attaching area of the polarizer, and attaching the second attaching area of the polarizer onto the base substrate such that the second attaching area at least partially overlaps with the bonding area.

Optionally, between the step of attaching the first attaching area of the polarizer onto the base substrate and the step of attaching the second attaching area of the polarizer onto the base substrate, the manufacturing method further includes a step of:

laminating a driving chip in the bonding area of the base substrate.

Optionally, before the step of attaching the first attaching area of the polarizer onto the base substrate, the manufacturing method further includes a step of:

cutting the release film along a preset cutting line to form a first release pattern and a second release pattern, wherein the first release pattern corresponds to the first attaching area and the second release pattern corresponds to the second attaching area.

Optionally, an area of the first attaching area is larger than an area of the second attaching area.

Optionally, both the first attaching area and the second attaching area are in the shape of a rectangle.

Optionally, the second attaching area and the bonding area completely overlap.

In still another aspect, the present invention further provides a polarizer attaching film including a polarizer and a release film, the release film being attached to an attaching surface of the polarizer, wherein:

the polarizer includes a first attaching area and a second attaching area, and when the polarizer is attached onto a base substrate of an array substrate, the first attaching area is in a non-bonding area of the base substrate and the second attaching area at least partially overlaps with a bonding area of the base substrate; and the release film includes a first release pattern corresponding to the first attaching area and a second release pattern corresponding to the second attaching area, and the first release pattern and the second release pattern are separated.

Optionally, an area of the first attaching area is larger than an area of the second attaching area.

Optionally, both the first attaching area and the second attaching area are in the shape of a rectangle.

Optionally, the second attaching area and the bonding area completely overlap.

In another aspect, the present invention further provides a manufacturing method of a polarizer attaching film, including steps of:

fabricating a polarizer and a release film such that the release film is attached onto an attaching surface of the polarizer, wherein the polarizer includes a first attaching area and a second attaching area, and when the polarizer is attached onto a base substrate of an array substrate, the first attaching area is in a non-bonding area of the base substrate and the second attaching area at least partially overlaps with a bonding area of the base substrate; and cutting the release film along a preset cutting line to form a first release pattern and a second release pattern, wherein the first release pattern corresponds to the first attaching area and the second release pattern corresponds to the second attaching area.

The present invention has the beneficial effects as follows.

The present invention provides an array substrate and a manufacturing method thereof as well as a polarizer attaching film and a manufacturing method thereof, the manufacturing method of an array substrate includes: removing a part of a release film corresponding to a first attaching area of the polarizer, and attaching the first attaching area of the polarizer onto the base substrate such that the first attaching area is in a non-bonding area; and removing a part of the release film corresponding to a second attaching area of the polarizer, and attaching the second attaching area of the polarizer with the base substrate such that the second attaching area at least partially overlaps with a bonding area. In a technical solution of the present invention, a part of the polarizer is firstly attached onto the array substrate without covering the bonding area on the base substrate, which can ensure normal operation of a bonding process; after the bonding process is completed, the remaining part of the polarizer that has not been attached is attached to the base substrate such that the second attaching area at least partially overlaps with the bonding area, which can effectively avoid light leak of an OC.

BRIEF DESCRIPTION OF THE DRAWINGS

FIG. 1 is a schematic diagram of performing a bonding process in the prior art;

FIG. 2 is a schematic diagram of a structure of an array substrate provided by an embodiment of the present invention;

FIG. 3 is a flow chart of a manufacturing method of an array substrate provided by an embodiment of the present invention;

DETAILED DESCRIPTION OF THE EMBODIMENTS

Figure 4:
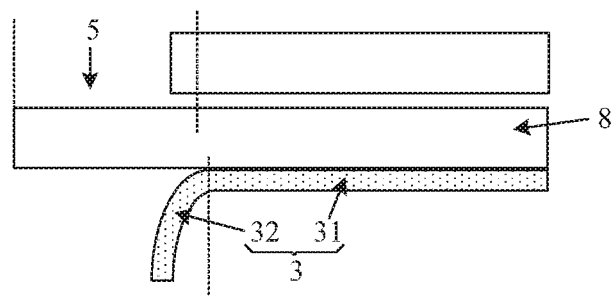
FIG. 4 is a schematic diagram of attaching a first attaching area of a polarizer onto a base substrate according to an embodiment of the present invention.

To enable those skilled in the art to better understand technical solutions of the present invention, an array substrate and a manufacturing method thereof as well as a polarizer attaching film and a manufacturing method thereof provided by the present invention will be described in detail below in conjunction with the accompanying drawings.

According to one aspect of the present invention, there is provided an array substrate. FIG. 2 is a schematic diagram of a structure of an array substrate provided by an embodiment of the present invention. As shown in FIG. 2, the array substrate includes a base substrate 8 and a polarizer 3, the base substrate 8 is partitioned into a bonding area 5 and a non-bonding area (the area except the bonding area 5 in the figure), and the polarizer 3 includes a first attaching area 31 and a second attaching area 32, the first attaching area 31 being within the non-bonding area and the second attaching area 32 at least partially overlapping with the bonding area 5.

The technical solution of the present invention overcomes the technical prejudice that the polarizer on the array substrate side should not overlap with the bonding area at all in order to ensure normal operation of the bonding process. In the embodiment, the polarizer 3 at least partially overlaps with the bonding area 5 (i.e., the polarizer 3 at least covers a part of the bonding area 5), which can not only ensure normal operation of the bonding process but also effectively avoid light leak of an OC.

In the embodiment, a process of attaching the polarizer 3 onto the base substrate 8 includes the following steps 1 and 2.

Step 1 includes: attaching a first attaching area 31 of the polarizer 3 onto the base substrate 8 such that the first attaching area 31 attached to the base substrate 8 is totally within the non-bonding area, that is, does not overlap with the bonding area 5.

It should be noted that after completion of step 1, the part (i.e., the first attaching area 31) of the polarizer 3 attached to the base substrate 8 does not overlap with the bonding area 5, so that enough space is reserved for a subsequent bonding process and it is ensured that an indenter causes no damage to the polarizer during the subsequent bonding process.

Step 2 includes: after the bonding process is completed, attaching a second attaching area 32 of the polarizer 3 to the base substrate 8 such that the second attaching area 32 of the polarizer 3 at least partially overlaps with the bonding area 5, that is, the second attaching area 32 of the polarizer 3 at least covers a part of the bonding area 5.

It should be noted that in the technical solution provided by the present invention, a process of attaching the polarizer 3 is performed in two independent steps, which can break through the restriction on the size of the polarizer 3 in the bonding process and further allow the polarizer 3 on the array substrate side to at least partially overlap with the bonding area, thus effectively avoiding light leak. As an optional solution in the embodiment, the polarizer 3 may completely cover the base substrate 8.

In the embodiment, optionally, the array substrate further includes a driving chip 4 located within the bonding area 5.

Considering that on the base substrate 8, the area of the non-bonding area is larger than that of the bonding area 5, in the embodiment, the area of the first attaching area 31 is larger than that of the second attaching area 32. During the bonding process, since most area (the first attaching area 31) of the polarizer 3 has been attached to the base substrate, a relatively strong bonding force exists between the polarizer 3 and the base substrate 8, and thus the problem of relative movement between the polarizer 3 and the base substrate 8 during the bonding process can be avoided.

According to another aspect of the present invention, there is provided a manufacturing method of an array substrate, and the array substrate may be the array substrate in the above-described embodiment. FIG. 3 is a flow chart of a manufacturing method of an array substrate provided by an embodiment of the present invention. As shown in FIG. 3, the manufacturing method of an array substrate includes steps 101 and 103.

Step 101 includes: removing a part of a release film corresponding to the first attaching area of the polarizer, and attaching the first attaching area of the polarizer onto the base substrate such that the first attaching area is in the non-bonding area.

It should be noted that the release film in the embodiment refers to a protective film attached to an attaching surface of the polarizer that has not been attached to the base substrate. During use of the polarizer, the release film needs to be removed firstly to expose the attaching surface of the polarizer, and then the polarizer is attached.

FIG. 4 is a schematic diagram of attaching a first attaching area 31 of the polarizer onto a base substrate according to an embodiment of the present invention. As shown in FIG. 4, in step 101, the part of the release film (not shown) corresponding to the first attaching area is removed, and at this time, the attaching surface of the first attaching area 31 of the polarizer 3 is exposed, but the attaching surface of the second attaching area 32 of the polarizer 3 is still attached with the remaining release film. Then, the first attaching area 31 of the polarizer 3 is attached to the base substrate 8 such that the first attaching area 31 is totally within the non-bonding area of the base substrate 8, that is, in this case, the polarizer 3 and the bonding area 5 of the base substrate 8 do not overlap at all.

Because the first attaching area 31 of the polarizer 3 and the bonding area do not overlap at all, enough room is reserved for a subsequent bonding process, and thus an indenter causes no damage to the polarizer 3 during the subsequent bonding process.

Optionally, material of the polarizer 3 is polyvinyl alcohol.

Step 103 includes: removing a part of the release film corresponding to the second attaching area of the polarizer, and attaching the second attaching area of the polarizer onto the base substrate such that the second attaching area at least partially overlaps with the bonding area.

Figure 5:
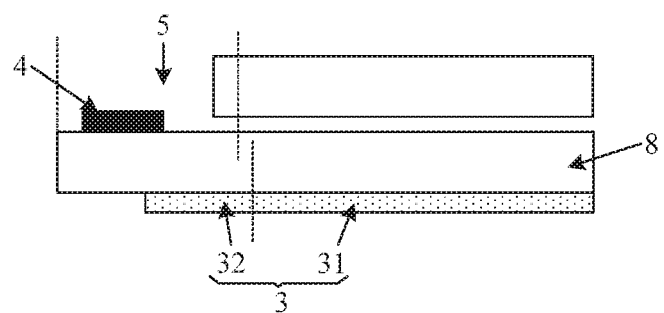
FIG. 5 is a schematic diagram of attaching a second attaching area of the polarizer onto the base substrate according to the embodiment of the present invention.

FIG. 5 is a schematic diagram of attaching the second attaching area 32 of the polarizer onto the base substrate according to the embodiment of the present invention. As shown in FIG. 5, in step 103, the remaining release film (the release film corresponding to the second attaching area 32) on the polarizer 3 is removed firstly, so as to expose the attaching surface of the second attaching area 32 of the polarizer 3. Then, the second attaching area 32 of the polarizer 3 is attached to the base substrate 8 such that the bonding area 5 of the base substrate 8 is at least partially covered by the polarizer 3, thereby effectively avoiding light leak of an OC.

In the embodiment, optionally, the area of the first attaching area 31 is larger than the area of the second attaching area 32. In this way, during the bonding process, a relatively strong bonding force exists between the polarizer 3 and the base substrate 8, and thus relative movement between the polarizer 3 and the base substrate 8 during the bonding process can be avoided.

In the manufacturing method of an array substrate provided by the embodiment of the present invention, a part of the polarizer is firstly attached onto the array substrate without covering the bonding area on the base substrate, which can ensure normal operation of the bonding process; after the bonding process is completed, the remaining part of the polarizer that has not been attached is attached to the base substrate, which can effectively avoid light leak of an OC.

Figure 6:
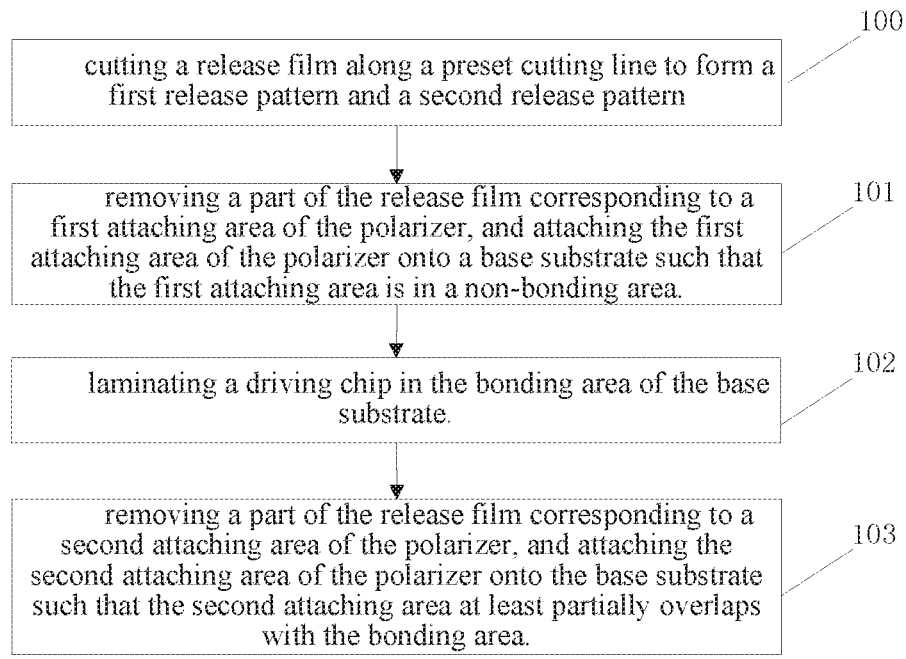
FIG. 6 is a flow chart of a manufacturing method of an array substrate provided by an embodiment of the present invention.

FIG. 6 is a flow chart of a manufacturing method of an array substrate provided by another embodiment of the present invention. As shown in FIG. 6, the array substrate is the array substrate in the above-described embodiment, and the manufacturing method of an array substrate may include steps 100 to 103.

Step 100 includes: cutting the release film along a preset cutting line to form a first release pattern and a second release pattern.

Figure 7:
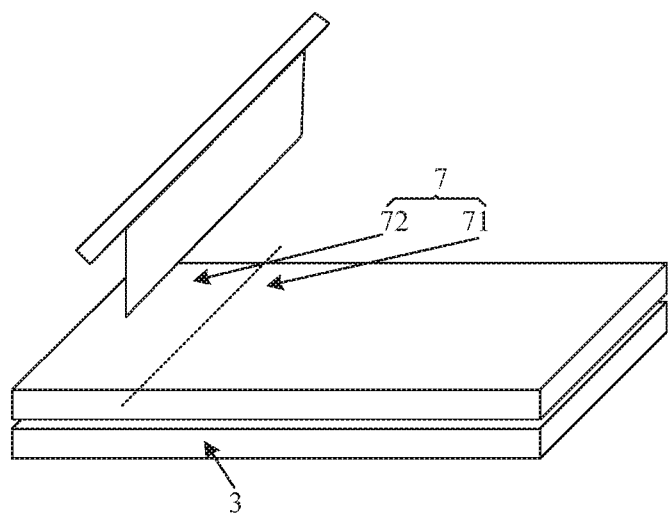
FIG. 7 is a schematic diagram of cutting a release film according to an embodiment of the present invention.

FIG. 7 is a schematic diagram of cutting a release film according to an embodiment of the present invention. As shown in FIG. 7, the release film 7 attached to the attaching surface of the polarizer 3 is of an integral structure in the prior art, but in the present invention, the release film 7 is cut along a preset cutting line to form a first release pattern 71 and a second release pattern 72, wherein the first release pattern 71 corresponds to the first attaching area 31 and the second release pattern 72 corresponds to the second attaching area 32, and thus, the first attaching area 31 and the second attaching area 32 of the polarizer 3 can be attached onto the base substrate separately in subsequent steps.

Step 101 includes: removing a part of the release film corresponding to the first attaching area of the polarizer, and attaching the first attaching area of the polarizer onto the base substrate such that the first attaching area is totally in the non-bonding area.

It should be noted that description of step 101 can refer to the foregoing description of step 101 with reference to FIG. 3 and is not repeated herein.

Step 102 includes: laminating a driving chip into the bonding area of the base substrate.

Figure 8:
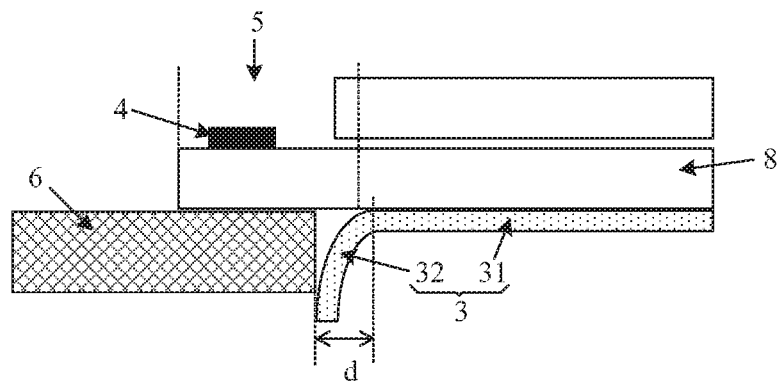
FIG. 8 is a schematic diagram of laminating a driving chip onto a bonding area of a base substrate according to an embodiment of the present invention.

FIG. 8 is a schematic diagram of laminating a driving chip onto a bonding area of a base substrate according to an embodiment of the present invention. As shown in FIG. 8, after the first attaching area 31 of the polarizer 3 is attached to the base substrate 8, the polarizer 3 does not cover the bonding area of the base substrate 8. In the process of laminating the driving chip 4 onto the bonding area 5 of the base substrate 8, it is possible to allow the distance d of an indenter 6 located below the base substrate 8 from the polarizer 3 (i.e., the first attaching area 31) attached onto the base substrate 8 to exceed 0.7 mm, which further ensures normal operation of the bonding process.

It should be noted that the bonding process is a common technique in the art and the specific procedures thereof are not described in detail herein.

Step 103 includes: removing a part of the release film corresponding to the second attaching area of the polarizer, and attaching the second attaching area of the polarizer onto the base substrate such that the second attaching area at least partially overlaps with the bonding area it should be noted that description of step 103 can refer to the foregoing description of step 103 with reference to FIG. 3 and is not repeated herein.

Figure 9:
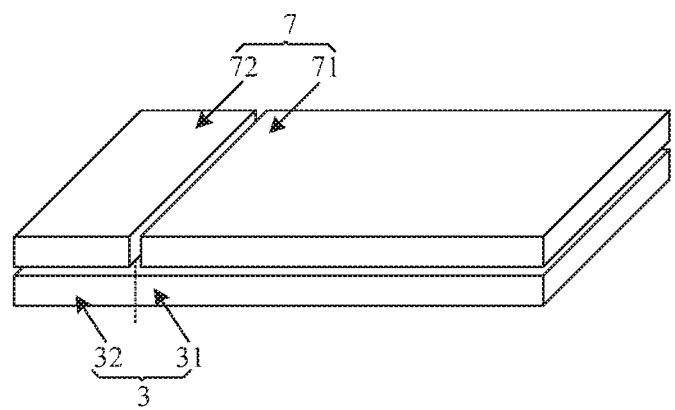
FIG. 9 is a schematic diagram of a structure of a polarizer attaching film provided by an embodiment of the present invention.

According to still another aspect of the present invention, there is provided a polarizer attaching film, and FIG. 9 is a schematic diagram of a structure of a polarizer attaching film provide by an embodiment of the present invention. As shown in FIG. 9, the polarizer attaching film includes a polarizer 3 and a release film 7, wherein the release film 7 is attached to an attaching surface of the polarizer 3.

The polarizer 3 includes a first attaching area 31 and a second attaching area 32, and when the polarizer 3 is attached onto a base substrate 8 of an array substrate, the first attaching area 31 and a bonding area 5 of the base substrate 8 do not overlap at all and the second attaching area 32 and the bonding area 5 of the base substrate 8 at least partially overlap.

Optionally, material of the polarizer 3 is polyvinyl alcohol.

The release film 7 includes a first release pattern 71 corresponding to the first attaching area 31 and a second release pattern 72 corresponding to the second attaching area 32, and the first release pattern 71 and the second release pattern 72 are separable.

Different from the prior art, the release film 7 of the polarizer attaching film provided by the present invention is comprised of two parts that are separable, therefore, the first release pattern 71 and the second release pattern 72 can be removed at different times according to practical needs, and as a result, the first attaching area 31 and the second attaching area 32 of the polarizer 3 can be attached at different times.

In practical application, the first release pattern 71 can be removed firstly, then the first attaching area 31 of the polarizer 3 is attached to the base substrate 8, and at this point, the first attaching area 31 and the bonding area 5 on the array substrate 1 for performing the bonding process do not overlap at all, thus reserving enough room for normal operation of the bonding process; then, the bonding process is performed normally in the bonding area 5; next, the second release pattern 72 is removed; and lastly the second attaching area 32 of the polarizer 3 is attached to the base substrate 8 to avoid light leak at periphery of an OC. It can be seen that the polarizer attaching film provided by the embodiment can not only avoid leak light of an OC but also allow normal operation of the bonding process.

It should be noted that, considering that on the base substrate 8, the area of the non-bonding area is larger than that of the bonding area 5, the area of the first attaching area 31 may be larger than that of the second attaching area 32 in the embodiment. Therefore, after most area (i.e., the first attaching area 31) of the polarizer 3 is attached to the base substrate 8, bonding force between the polarizer 3 and the base substrate 8 can be ensured effectively, and thus the problem of relative movement between the polarizer 3 and the base substrate 8 during the subsequent bonding process can be avoided.

Optionally, both the first attaching area 31 and the second attaching area 32 are in the shape of a rectangle, and accordingly, both the first release pattern 71 and the second release pattern 72 are also in the shape of a rectangle, which can facilitate removal of the release patterns and attachment of the attaching areas to the base substrate 8.

It should be noted that the case where both the first attaching area 31 and the second attaching area 32 are in the shape of a rectangle is exemplary only, and is not intended to limit the technical solution of the present invention. It should be appreciated by those skilled in the art that specific shapes and sizes of the first attaching area 31 and the second attaching area 32 in the present invention may be adjusted according to practical needs.

Figure 10:
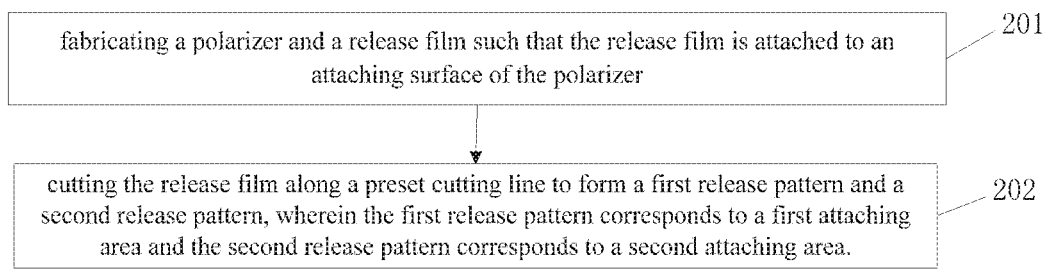
FIG. 10 is flow chart of a manufacturing method of a polarizer attaching film provided by an embodiment of the present invention.

According to yet another aspect of the present invention, there is provided a manufacturing method of a polarizer attaching film, and FIG. 10 is flow chart of a manufacturing method of a polarizer attaching film provided by an embodiment of the present invention. As shown in FIG. 10, the polarizer attaching film is the polarizer attaching film in the above-described embodiment, and the manufacturing method of a polarizer attaching film includes steps 201 and 202.

Step 201 includes: fabricating a polarizer and a release film such that the release film is attached to an attaching surface of the polarizer.

In step 201, the polarizer 3 and the release film 7 which are attached together are fabricated by using an existing process for fabricating a polarizer attaching film. Here, the release film 7 is of an integral structure.

Step 202 includes: cutting the release film along a preset cutting line to form a first release pattern and a second release pattern, wherein the first release pattern corresponds to the first attaching area of the polarizer and the second release pattern corresponds to the second attaching area of the polarizer.

Referring to FIGS. 8 and 9, the polarizer 3 may be partitioned into a first attaching area 31 and a second attaching area 32, and when the polarizer 3 is attached to a base substrate 8, the first attaching area 31 and a bonding area 5 of the base substrate 8 do not overlap at all.

In step 202, the release film 7 is cut along the preset cutting line (i.e., a boundary between the first attaching area 31 and the second attaching area 32) by a cutting device, so as to form the first release pattern 71 and the second release pattern 72. In this case, the polarizer 3 is still of an integral structure. The first release pattern 71 and the second release pattern 72 can be separately removed at different times during use.

It should be noted that, in the present invention, a case where two structures overlap means that projections of the two structures on the base substrate overlap. For example, the second attaching area 32 and the bonding area 5 of the base substrate 8 at least partially overlap, which means the projection of the second attaching area 32 on the base substrate 8 at least partially overlaps with the bonding area 5 of the base substrate 8. Similarly, the first attaching area 31 and the bonding area 5 of the base substrate 8 do not overlap at all, which means the projection of the first attaching area 31 on the base substrate 8 does not overlap with the bonding area 5 of the base substrate 8 at all.

It could be understood that the above implementations are only exemplary implementations for describing the principle of the present invention, but the present invention is not limited thereto. Those skilled in the art may make various variations and improvements without departing from the spirit and the essence of the present invention, and these variations and the improvements are also considered as falling into the protection scope of the present invention.

The invention claimed is:

1. An array substrate, comprising a base substrate and a polarizer, the base substrate being partitioned into a bonding area and a non-bonding area, wherein the polarizer comprises a first attaching area and a second attaching area, the first attaching area is in the non-bonding area and the second attaching area at least partially overlaps with the bonding area, the array substrate further includes a driving chip in the bonding area, and a projection of the second attaching area on the base substrate overlaps with a projection of the driving chip on the base substrate.

2. The array substrate according to claim 1, wherein an area of the first attaching area is larger than an area of the second attaching area.

3. The array substrate according to claim 2, wherein the second attaching area and the bonding area completely overlap.

4. The array substrate according to claim 1, wherein the second attaching area and the bonding area completely overlap.

5. A manufacturing method of an array substrate, wherein the array substrate is the array substrate according to claim 1, and the manufacturing method of an array substrate comprises steps of:
    removing a part of a release film corresponding to the first attaching area of the polarizer, and attaching the first attaching area of the polarizer onto the base substrate such that the first attaching area is in the non-bonding area; and
    removing a part of the release film corresponding to the second attaching area of the polarizer, and attaching the second attaching area of the polarizer onto the base substrate such that the second attaching area at least partially overlaps with the bonding area, wherein the manufacturing method further comprises, between the step of attaching the first attaching area of the polarizer onto the base substrate and the step of attaching the second attaching area of the polarizer onto the base substrate, a step of:
    laminating a driving chip in the bonding area of the base substrate, wherein a projection of the second attaching area on the base substrate overlaps with a projection of the driving chip on the base substrate.

6. The manufacturing method of an array substrate according to claim 5, further comprising, before the step of attaching the first attaching area of the polarizer onto the base substrate, a step of:
    cutting the release film along a preset cutting line to form a first release pattern and a second release pattern, wherein the first release pattern corresponds to the first attaching area and the second release pattern corresponds to the second attaching area.

7. The manufacturing method of an array substrate according to claim 6, wherein the second attaching area and the bonding area completely overlap.

8. The manufacturing method of an array substrate according to claim 5, wherein an area of the first attaching area is larger than an area of the second attaching area.

9. The manufacturing method of an array substrate according to claim 8, wherein the second attaching area and the bonding area completely overlap.

10. The manufacturing method of an array substrate according to claim 5, wherein the second attaching area and the bonding area completely overlap.

11. A polarizer attaching film, comprising polarizer and a release film, the release film being attached to an attaching surface of the polarizer, and the release film and the polarizer completely overlapping, wherein:
    the polarizer comprises a first attaching area and a second attaching area, and when the polarizer is attached onto a base substrate of an array substrate, the first attaching area is in a non-bonding area of the base substrate and the second attaching area at least partially overlaps with a bonding area of the base substrate; and
    the release film comprises a first release pattern corresponding to the first attaching area and a second release pattern corresponding to the second attaching area, and the first release pattern and the second release pattern are separable.

12. The polarizer attaching film according to claim 11, wherein an area of the first attaching area is larger than an area of the second attaching area.

13. The polarizer attaching film according to claim 12, wherein the second attaching area and the bonding area of the base substrate completely overlap.

14. The polarizer attaching film according to claim 11, wherein, both the first attaching area and the second attaching area are in the shape of a rectangle.

15. The polarizer attaching film according to claim 14, wherein the second attaching area and the bonding area of the base substrate completely overlap.

16. The polarizer attaching film according to claim 11, wherein the second attaching area and the bonding area of the base substrate completely overlap.

* * * * *